(12) United States Patent
Knitowski et al.

(10) Patent No.: US 8,788,358 B2
(45) Date of Patent: Jul. 22, 2014

(54) SYSTEMS AND METHODS FOR ENTERPRISE BRANDED APPLICATION FRAMEWORKS FOR MOBILE AND OTHER ENVIRONMENTS

(75) Inventors: Alan S. Knitowski, Austin, TX (US); Luan Dang, Newport Beach, CA (US); Alan M. Kane, Pflugerville, TX (US); James D. Trim, Pflugerville, TX (US); Anthony C. Hall, Austin, TX (US)

(73) Assignee: Phunware, Inc., Austin, TX (US)

( * ) Notice: Subject to any disclaimer, the term of this patent is extended or adjusted under 35 U.S.C. 154(b) by 0 days.

(21) Appl. No.: 13/033,526

(22) Filed: Feb. 23, 2011

(65) Prior Publication Data

US 2011/0320967 A1    Dec. 29, 2011

Related U.S. Application Data

(60) Provisional application No. 61/308,284, filed on Feb. 25, 2010.

(51) Int. Cl.
*G06Q 30/00*    (2012.01)

(52) U.S. Cl.
USPC ........................................... 705/26.1

(58) Field of Classification Search
USPC .............................. 705/26.1–27.2
See application file for complete search history.

(56) References Cited

U.S. PATENT DOCUMENTS

| | | |
|---|---|---|
| 2003/0182195 A1 | 9/2003 | Kumar |
| 2005/0026700 A1 | 2/2005 | Blanco |
| 2005/0189415 A1* | 9/2005 | Fano et al. ............... 235/383 |
| 2005/0267816 A1 | 12/2005 | Jaramillo |
| 2007/0094156 A1 | 4/2007 | Isaacs |
| 2008/0082930 A1 | 4/2008 | Omernick et al. |
| 2008/0092052 A1* | 4/2008 | Mathews et al. ......... 715/736 |
| 2008/0103906 A1 | 5/2008 | Singh |
| 2009/0037296 A1* | 2/2009 | Jaramillo ................. 705/27 |
| 2009/0165140 A1 | 6/2009 | Robinson et al. |
| 2009/0299817 A1 | 12/2009 | Fok et al. |

OTHER PUBLICATIONS www.uscf.org (Dec. 16, 2008, 34 selected pages).*
International search report and written opinion dated Oct. 31, 2011 for PCT/US2011/025944.

* cited by examiner

*Primary Examiner* — Ethan D Civan
(74) *Attorney, Agent, or Firm* — Wilson Sonsini Goodrich & Rosati

(57) ABSTRACT

An application framework for mobile devices may provide a variety of application modules directed towards enterprise brand extension. The application modules are organized into five main categories: (1) featured, (2) community, (3) play/engage, (4) media, and (5) shop. The "featured" category may allow enterprises to push specific content onto its consumers. The "community" category may allow enterprises to leverage social networks and consumer communities that build and expand around their brands. The "play/engage" category may allow enterprises to offer compelling value and engaging utility to its customers. The "media" category may allow enterprises to entertain, inform, and educate consumers about brands through media content. The "shop" category may allow enterprises to facilitate electronic commerce with its customers. Further application analytics may be utilized by aggregating affiliate, sales, or usage data, etc. to better drive new revenue streams and optimize the return on investment associated with sales, promotion and advertising efforts.

22 Claims, 9 Drawing Sheets

SYSTEMS AND METHODS FOR ENTERPRISE BRANDED APPLICATION FRAMEWORKS FOR MOBILE AND OTHER ENVIRONMENTS

CROSS-REFERENCE

This application claims the benefit of U.S. Provisional Application No. 61/308,284, filed Feb. 25, 2010, which application is incorporated herein by reference in its entirety.

BACKGROUND

Enterprises are often searching for new and innovative ways to market themselves to consumers and face many challenges in today's mobile marketplace. It can be difficult for enterprises (companies, universities, charities, musicians, media properties, etc.) to capture consumer attention. It is also often difficult for enterprises to separate and distinguish their own brands from the underlying noise of the marketplace.

Today's mobile consumers are inundated with dozens of handset and platform options. Enterprises are faced with the difficulty of creating applications that promote and extend their brand and trademarks on the various platform options that are chosen by consumers. Creating an application on each of these platforms can be an expensive process with, often, ineffective results.

What is needed is an application framework that can be utilized by enterprises (companies, universities, charities, musicians, media properties, etc.) to market and promote their brand.

SUMMARY

The invention provides systems and methods for an enterprise branded application framework. Various aspects of the invention described herein may be applied to any of the particular applications set forth below. The invention may be applied as a standalone system or as a component of an integrated software solution for programmable devices and their frameworks. The invention can be optionally integrated into existing business and processes seamlessly. It shall be understood that different aspects of the invention can be appreciated individually, collectively or in combination with each other.

In one aspect of the invention, a system for creating a mobile application framework for brand extension is provided. The system includes an interface to a network and a resource for organizing branding content provided by a developer to create the mobile application framework. The mobile application framework includes a navigation menu for accessing a plurality of pre-defined categories of branding features and submenus for providing access to specific functions within the pre-defined categories, and the pre-defined categories are assigned for brand extension depending on a targeted industry segment.

Other goals and advantages of the invention will be further appreciated and understood when considered in conjunction with the following description and accompanying drawings. While the following description may contain specific details describing particular embodiments of the invention, this should not be construed as limitations to the scope of the invention but rather as an exemplification of a preferred embodiment. For each aspect of the invention, many variations are possible as suggested herein that are known to those of ordinary skill in the art. A variety of changes and modifications can be made within the scope of the invention without departing from the spirit thereof.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION

In the following detailed description, numerous specific details are set forth in order to provide a thorough understanding of the invention. However it will be understood by those of ordinary skill in the art that the invention may be practiced without these specific details. In other instances, well-known methods, procedures, components and circuits have not been described in detail so as not to obscure the invention. Various modifications to the described embodiments will be apparent to those with skill in the art, and the general principles defined herein may be applied to other embodiments. The invention is not intended to be limited to the particular embodiments shown and described.

Embodiments of the invention provide enterprise branded mobile application infrastructures and frameworks equipped for navigating the complexities and challenges inherent in any branded entity's centric mobile initiatives, charting a roadmap and course for success in capturing consumer "screen share" and separating enterprise brands from the underlying noise of today's mobile marketplace. With dozens of handset and platform options and seemingly infinite ways to engage mobile consumers, embodiments of the present invention provide organizations of all types and sizes a proven mobile application infrastructure or framework that can be leveraged, trusted and depended on for commercial performance and measurable results.

Companies consistently struggle to engage and maintain excited, loyal and passionate consumer bases for their brands. Meanwhile, consumers are increasingly mobile, distracted and lack meaningful attention spans to emotionally invest in enterprise brand initiatives. An innovative enterprise branded mobile application framework may solve this problem. By providing consumers functional, engaging and entertaining mobile applications, enterprises can leverage these high value, "always on" and "always accessible" mobile touch points to encourage deeper and broader emotional investments in their enterprise brands and initiatives. In addition to the obvious benefits of pure brand extension, the infrastructure may provide multiple revenue alternatives, thus transitioning cost centers into profit centers with measurable real-time return-on-investment, data and feedback.

Figure 1:
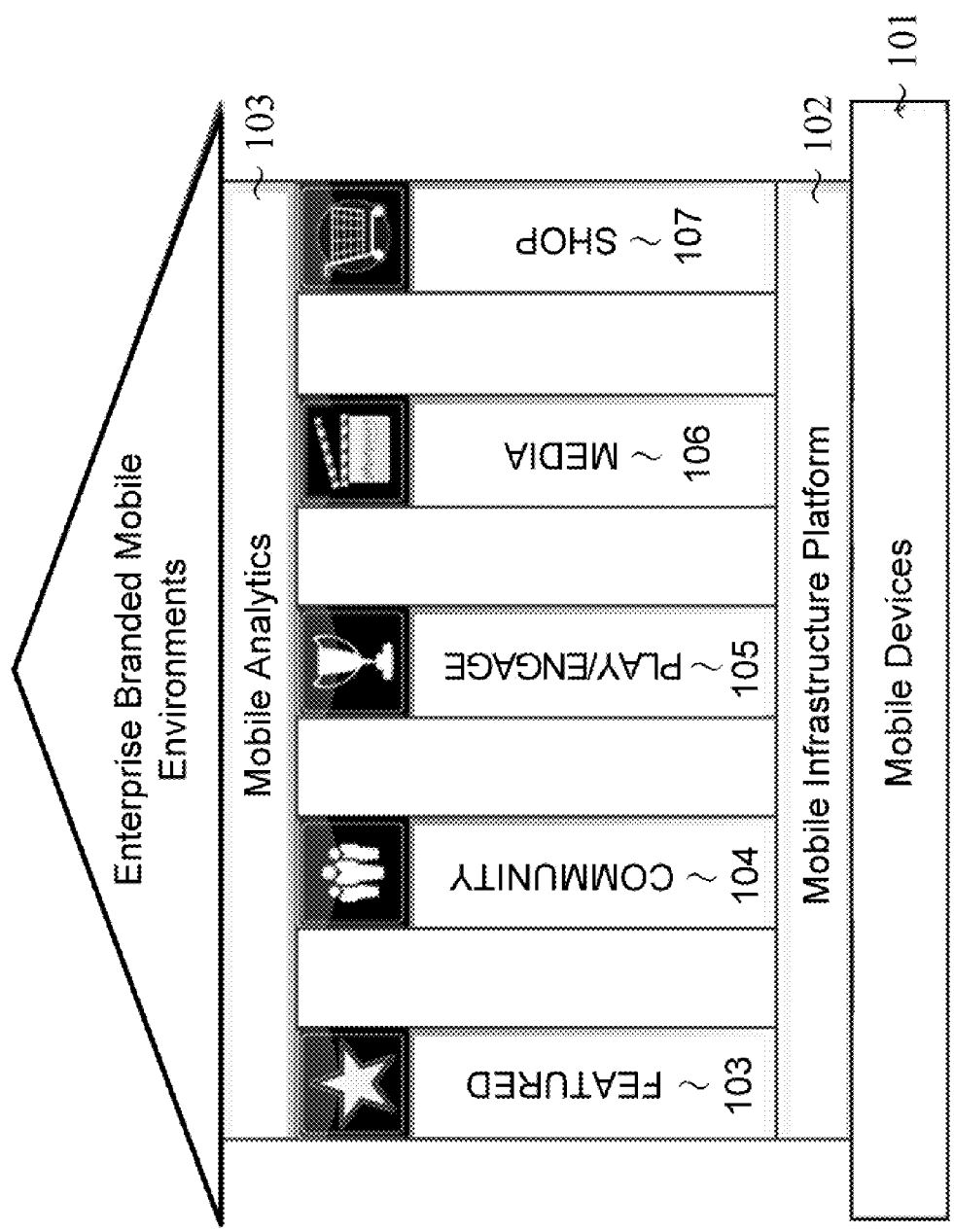
FIG. 1 illustrates an example of the structure for enterprise branded mobile environments (or application framework), in accordance with an embodiment of the present invention.

Referring to FIG. 1, an example of the structure for enterprise branded mobile environments (or application framework) is provided. Mobile devices 101 may communicate with a mobile infrastructure platform 102. The mobile infrastructure platform may provide a variety of mobile application modules. The mobile application modules may be organized into five main categories: (1) featured, (2) community, (3) play/engage, (4) media, and (5) shop. The "Featured" category 103 may allow enterprises to "push" specific content directly to its consumers based upon specific enterprise sales and marketing initiatives. The "Community" category 104 may allow enterprises to leverage the social networks and consumer communities that build and expand around their brands. The "Play/Engage" category 105 may allow enterprises to offer compelling value and engaging utility to its consumers. The "Media" category 106 may allow enterprises to entertain, inform and educate its consumers about their brands through videos, photos, audio podcasts and other mediums. The "Shop" category 107 may allow enterprises to facilitate mobile commerce with their consumers, whether digital or physical in nature. Thus, a mobile environment may be provided for extending enterprise brands.

To elaborate, within a "Featured" category 103, the platform may provide access to or notification of "what's new," "what's hot," "what's now," or "what's featured" including recently released headlines, news, announcements, schedules, promotions, merchandise specials, coupons, videos of interest, photos of interest, provide notifications, etc. Users may be able to take this information and publish it to their Twitter or Facebook or other social networks. Further, users may sort, filter and search the content provided. Thus, in this manner, an enterprise may notify users of certain content which may be of interest to its users.

Within a "Community" category 104, the platform may provide access to blogs, social networking sites such as Facebook, MySpace, Linkedin, Twitter, forums, chat interfaces, or message boards, etc. allowing its users to participate in a social way through the framework. Further, the "Community" function may provide an aggregation of social networking and blog feeds of various social networks of the user. The user may also take this information and publish it to their existing social networks, or post responses to the enterprise's Facebook page for example as a fan. The user may also sort, filter and search the content provided. Further, for example, users may provide profile content (or profile content may be accessed through various social networks of the user), users may upload photos, send and receive messages, access other connections or friends, etc. In addition, the framework could provide a mechanism in which an enterprise could entice customers to participate in a brand message within a social network (as described further below with respect to FIG. 8).

As part of the "Play/Engage" category 105, the platform (or application framework) may provide interactive, engaging, fun games or useful, unique, timely, and industry-specific utilities. Users may be able to play games against other users or individually through the platform (application framework) for entertainment or educational purposes. The games may be puzzles, trivia, or interactive games with micro transactions embedded, for example. The utilities may be scorecards for a sports-based enterprise, maps and wait-times for a theme park enterprise, etc., all of which may or may not include micro transaction capabilities.

As part of the "Media" category 106, the application framework (platform) may provide videos, video highlights, video trailers, previews, audio clips, podcasts, streaming archives, promos, photos, access to online databases or depositories of such content (such as YouTube videos), etc. Other content may include out-takes, top ten video lists, tutorials, bloopers, shows, video archives and any other photo or video content. A user may also sort, filter and search through the content provided or share it via email or social networks such as Facebook and/or Twitter.

Within a "Shop" or "Mobile Commerce" category 107, the platform (application framework) may provide an environment where users may purchase products, services, promotions, specials, listing, whether digital or physical in nature. The users may purchase such items through subscriptions or pay-per-view or through a variety of means, all from their mobile devices 101. The "Shop" may act as a storefront for product and service sales and may provide users with the ability for renewing subscriptions or even providing donations, depending on the brand or enterprise involved. The environment may also include mobile analytics, as discussed further below.

Figure 2:
FIG. 2 illustrates an example of how the mobile infrastructure platform (application framework) may be accessed on a mobile device, in accordance with an embodiment of the present invention.

Referring to FIG. 2, an example of how the mobile infrastructure platform (application framework) may be accessed on a mobile device is shown. Many applications are available on mobile device 200. The mobile infrastructure platform (application framework) 201 may be accessed on the mobile device through an application on the mobile device as shown in FIG. 2. Thus, the mobile application is structured as a package for brand extension. The mobile application may include a navigation menu for accessing a plurality of pre-defined categories of branding features and submenus for providing access to specific functions within the pre-defined categories. The pre-defined categories may be determined depending on the targeted industry or targeted users. Thus, the developer may create the package based on what brand is being promoted as well as the target audience. The platform (application framework) 201 may then provide access to the pre-packaged features within the package.

Figure 3:
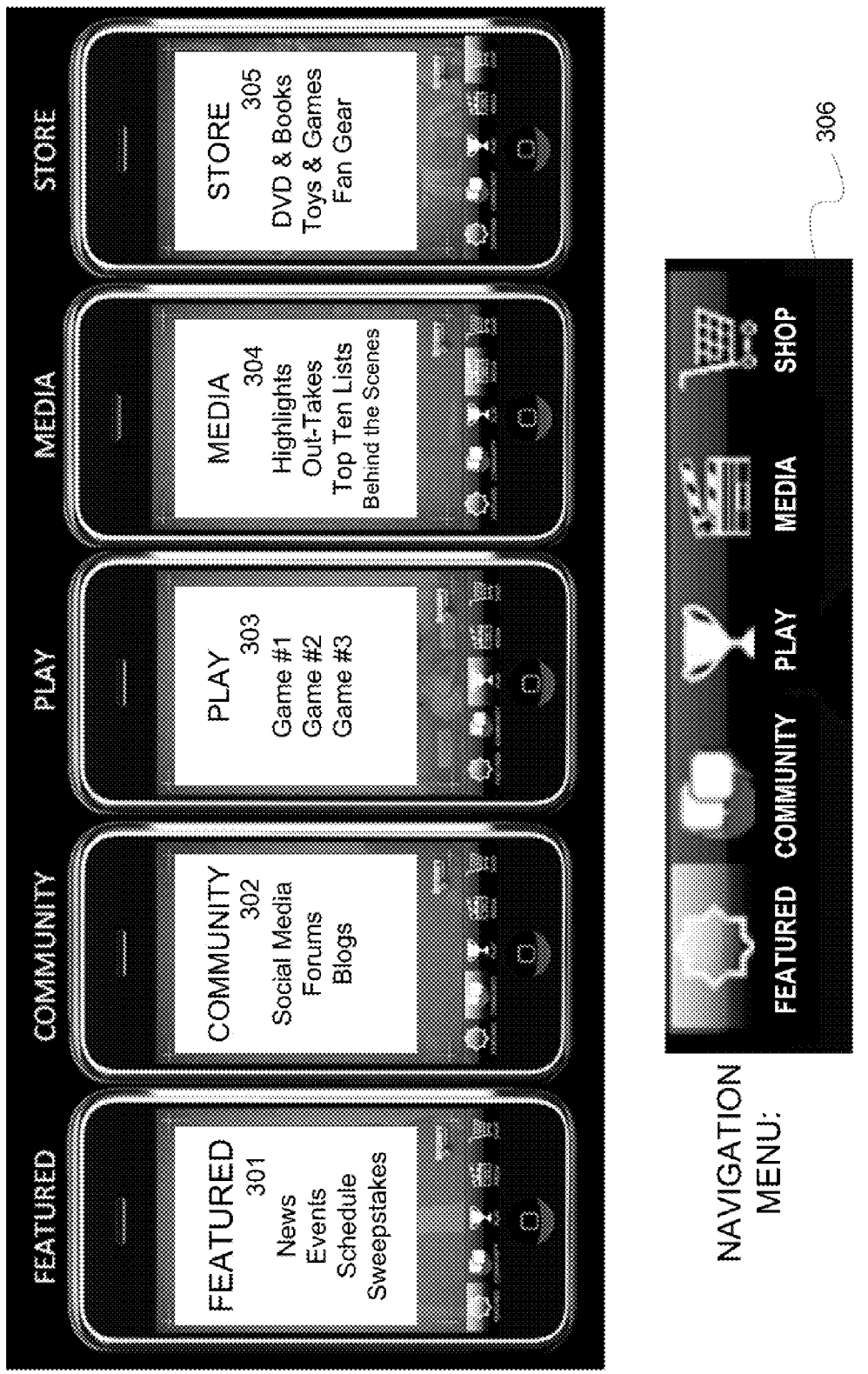
FIG. 3 illustrates an example of a mobile infrastructure platform (application framework) that is branded for a television show, in accordance with an embodiment of the present invention.

Referring to FIG. 3, an example of a mobile infrastructure platform (application framework) that is branded for a television show is shown. The mobile infrastructure platform (application framework) for the television show may include featured content 301 such as news, events, schedule or sweepstakes associated with the television show. Within the platform (application framework), community related elements 302 may also be accessed, including social media relating to the show, forums on topics related to the show, or blogs from users who have written about the show. Users accessing the platform (application framework) may also play games 303 relating to the show. For example, if the platform (application framework) is for a particular television show, users may play games related or created for that show. There may also be media 304 available for users to view including highlights of certain episodes, out-takes from filming, top ten lists, or behind the scenes content. In a store 305, users may purchase DVDs and books, toys and games, fan gear, or other related merchandise including digital copies of individual show episodes and/or full seasons. A navigation menu 306 may enable users to navigate through all of these various features and content via their mobile devices.

Figure 4:
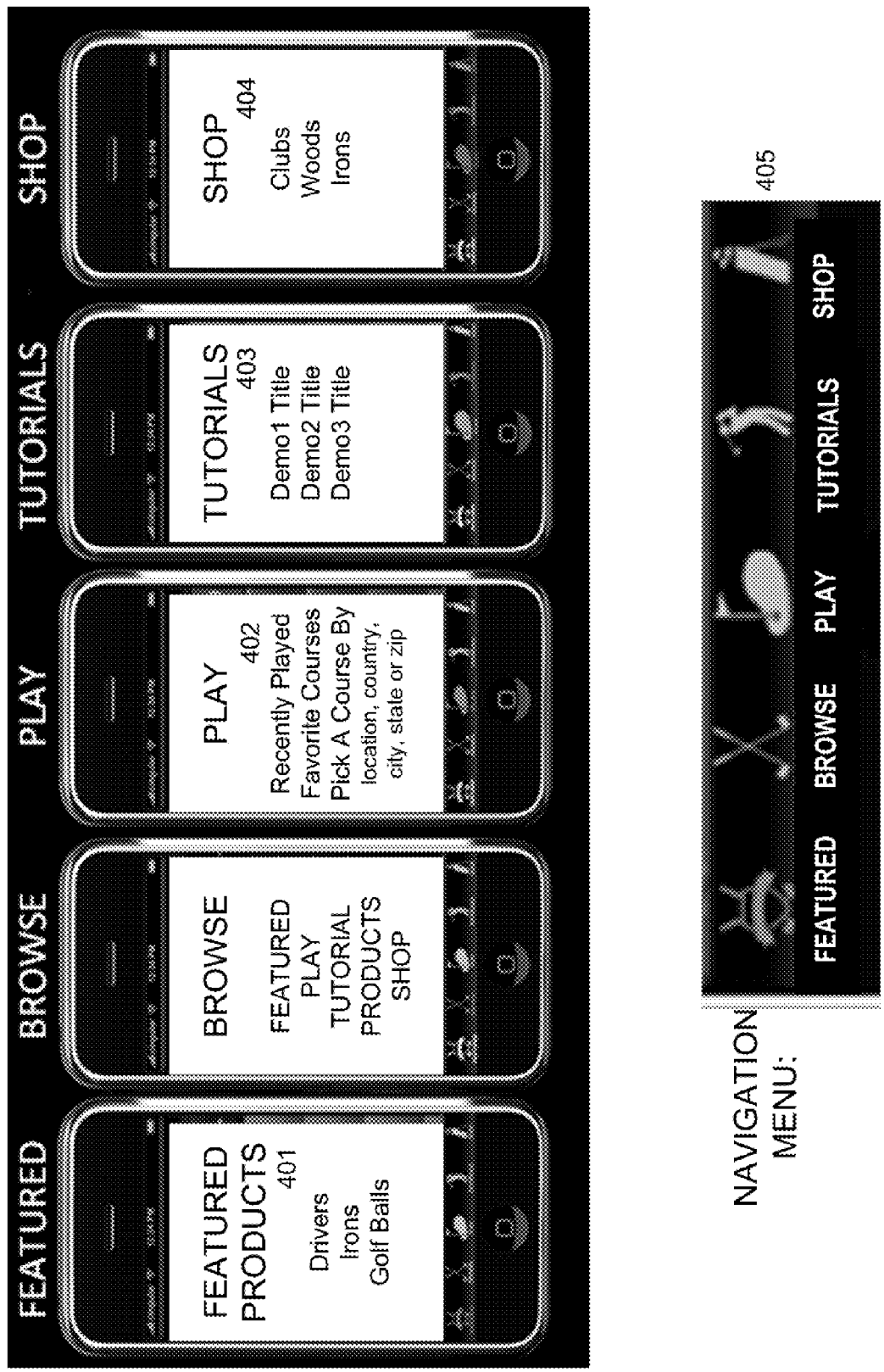
FIG. 4 illustrates an example of a mobile infrastructure platform (or application framework) that is branded for a golfing organization, in accordance with an embodiment of the present invention.

Referring to FIG. 4, an example of a mobile infrastructure platform (or application framework) that is branded for a golfing organization is shown. The mobile infrastructure platform for the golfing organization may include featured products 401 or information about those products. Within the platform, other content such as recently played courses, or the ability to search for a course by location 402 may be provided. The platform may include media such as tutorial videos 403, which may provide tips on play. The platform may also allow users to shop for equipment or accessories 404. A navigation menu 405 may enable users to navigate through all of these various features and content via their mobile devices.

Figure 5:
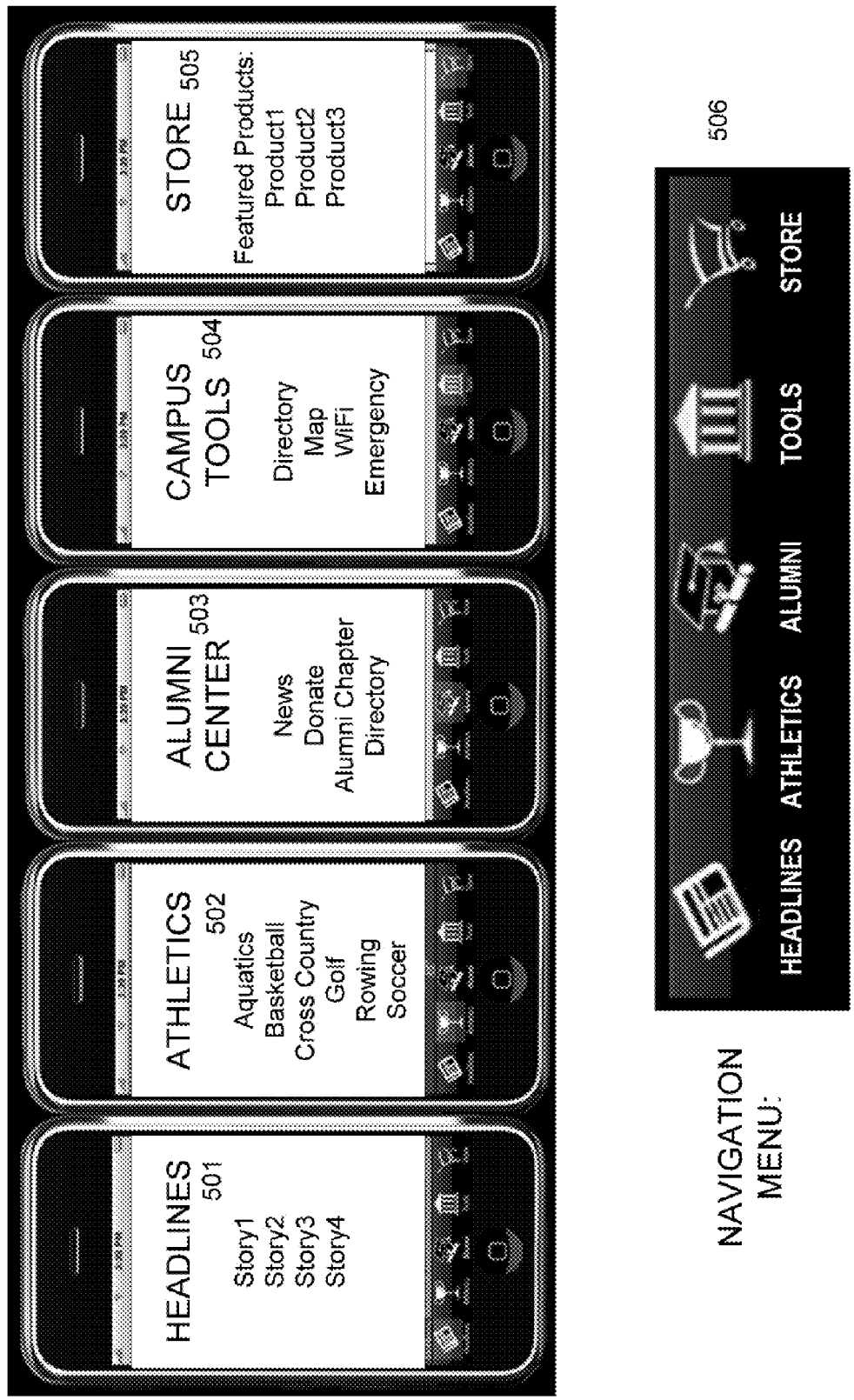
FIG. 5 illustrates an example of a mobile infrastructure platform (or application framework) that is branded for a university or college, in accordance with an embodiment of the present invention.

Referring to FIG. 5, an example of a mobile infrastructure platform (or application framework) that is branded for a university or college is shown. The mobile infrastructure platform for the college or university may include featured information 501 such as news, events, calendars, merchandise or information which is being highlighted by the college or university. The featured content may also include headlines 501 of university news, for example. As shown in FIG. 5, the platform may also provide athletic information 502—providing users access to various information relating to the school's athletic teams or performance of those teams, as well as the ability to purchase tickets or merchandise. A platform may also provide an alumni center 503, for example, which could allow access to news relating to alumni, or could provide a portal for donations to be made by alumni, or access to an alumni directory or other information. There could also be campus related tools 504 available such as directories, maps, dining information, etc. A campus store 505 may also be accessed through the platform, allowing users to purchase merchandise, view sales and specials, purchase tickets to athletic events, or access other information. A navigation menu 506 may enable users to navigate through all of these various features and content via their mobile devices.

Various other possibilities for brand extension are possible through mobile infrastructure platforms (or application frameworks) in accordance with embodiments of the present invention. For example, the mobile infrastructure platform may be customized for a celebrity brand, such as for a famous band. For a band, the platform could include providing access to featured content relating to the band, to information relating to the band's history, or to other information. Media such as photos, songs, recordings, albums, live recordings, record downloads, music videos, etc. may be downloaded or streamed through the platform. The platform may include tour information for upcoming shows and may include a map of the tour, for example. Users may also purchase music or merchandise and other accessories via the platform from their mobile devices.

Figure 6:
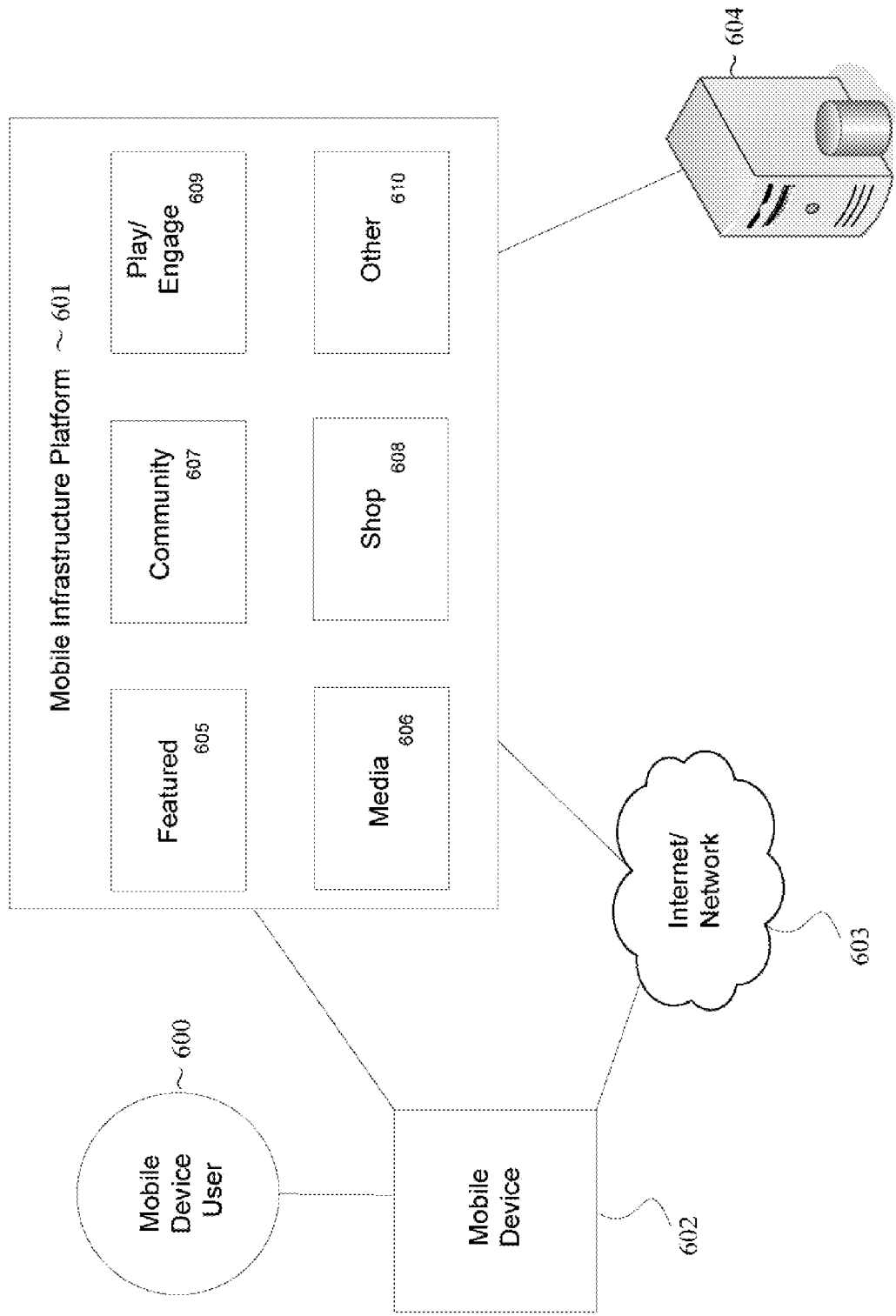
FIG. 6 illustrates an example of a mobile device user's interaction with the mobile infrastructure platform (or application framework), in accordance with an embodiment of the present invention.

Referring to FIG. 6, an example of a mobile device user's interaction with the mobile infrastructure platform (or application framework) is shown. The mobile device user 600 accesses the mobile infrastructure platform 601 through a mobile device 602 over a network such as the Internet 603. The mobile infrastructure platform 601 may be coupled to a server and a database 604. The various functions and content 605-610 are accessible within the mobile infrastructure platform 601.

Figure 7:
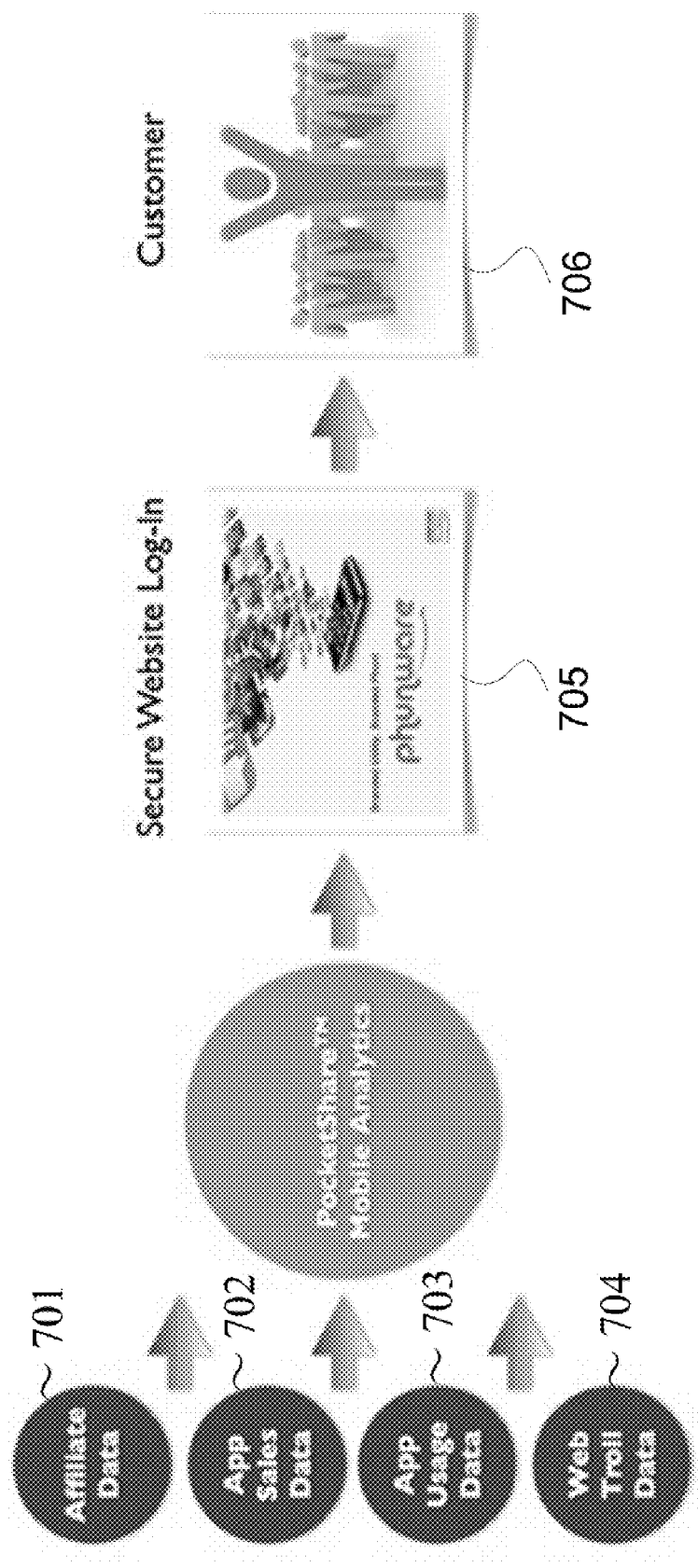
FIG. 7 illustrates how application analytics, such as mobile analytics, are utilized by the enterprise branded applications in order for enterprises to better drive new revenue streams and better optimize the return on investment associated with mobile sales, marketing, promotion and advertising efforts.

Referring to FIG. 7, application analytics, such as mobile analytics, are also utilized by the enterprise branded applications in order for enterprises to better drive new revenue streams and better optimize the return on investment associated with mobile sales, marketing, promotion and advertising efforts. Analytics may aggregate both quantitative and qualitative statistics for customers so that they can leverage "global real-time focus groups" through the enterprise branded applications. The analytics may aggregate various types of data including affiliate data 701, application sales data 702, application usage data 703, and web troll data 704 to provide meaningful information to its customers 706. More specifically, the application analytics may include network redirect summaries of where customers come from globally to an application purchasing interface to download enterprise branded applications. For example, the application analytics may include LinkShare summaries of where customers come from globally to iTunes to download enterprise branded applications. The application analytics may also include download statistics on the number of downloads and price of downloads achieved through iTunes or some other application purchasing interface. In addition, the application analytics may include real-time, in-application user and usage statistics by application, including the total number of times that the application was opened, the average time spent in the application, the navigation patterns within the application, the content consumed in the application, the number of times consumers balk at in-application transactions, the usage split between online and offline usage, data regarding wi-fi network usage, and 3G network usage, etc. Further, the mobile analytics may include Internet centric ratings, reviews and discussions about enterprise branded application usage worldwide.

For example, a branded mobile application framework for an animal health informational website may include analytics for the percentage of pet symptom requests for dogs versus cats, the top five symptoms searched for dogs, the top five symptoms searched for cats, the distribution of network usage type, and the actions that users take when capturing diagnostic information from and for their pets to take health actions for their animals.

Figure 8:
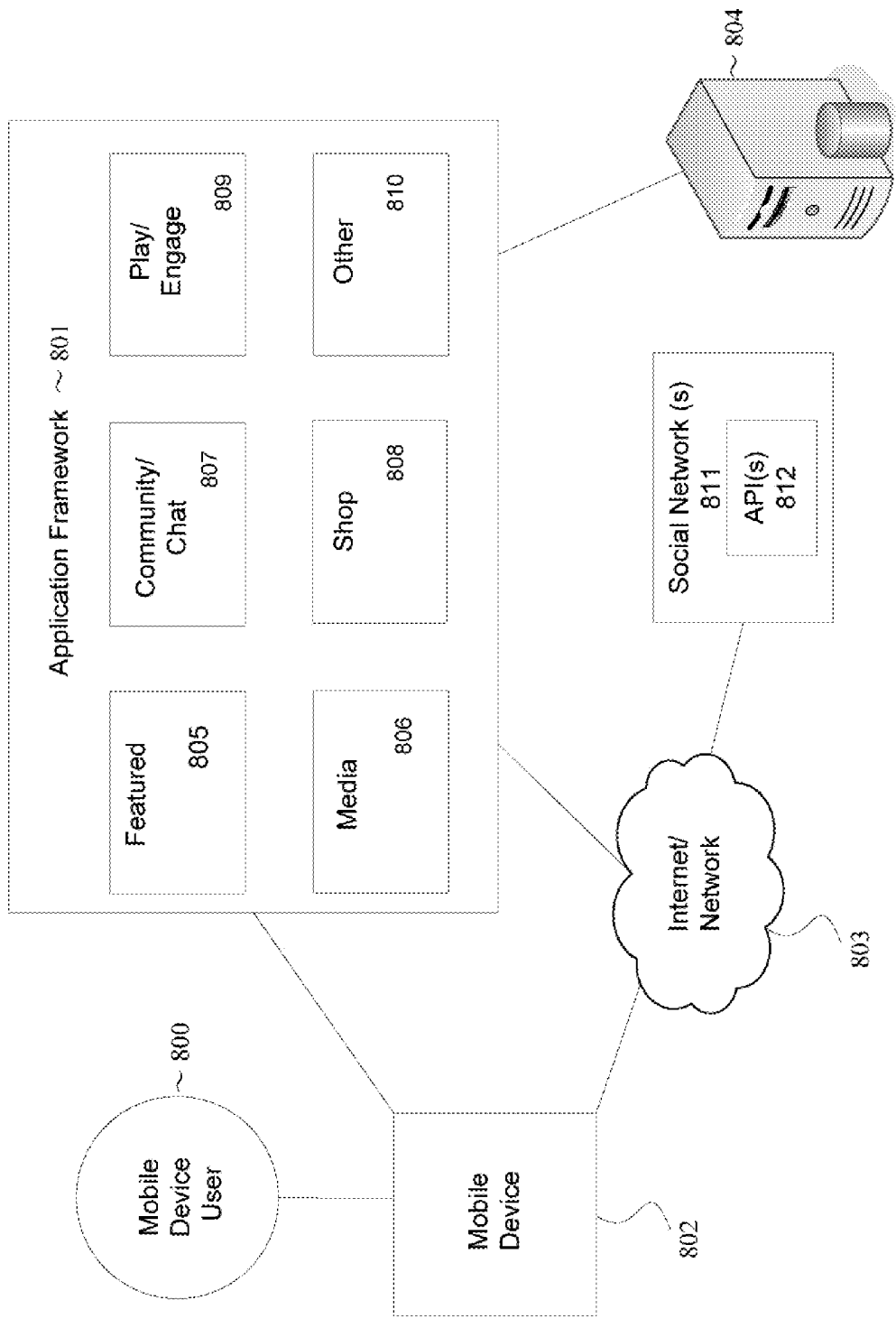
FIG. 8 illustrates an example where an application framework may be leveraged to provide a conduit for consumer participation in a social network, in accordance with an embodiment of the present invention.

Referring to FIG. 8, an example where an application framework may be leveraged to provide a conduit for consumer participation in a social network is shown. The application framework 801 connects to a social network 811 via an application programming interface (API) 812 or other similar mechanism. The application framework 801 then uses the unique capabilities of the particular social network or networks 811 to encourage consumers 800 to communicate in a branded forum.

For example, in the case of Twitter (or other microblogs, posting or messaging platforms), the use of tagging within Tweets may be used to drive up messages pertaining to an enterprise brand. To accomplish this the application framework 801 may provide an interface such as a real-time "chat"

within the community features 807 that utilizes a user's Twitter membership to send Tweets that have a particular tag. Thus, any user utilizing the chat features 807 of the application framework 801 would in turn be providing an enterprise branding message within the social network Twitter 811. This same method could be utilized on any social network 811 by tailoring the technique to match the capabilities of the particular social network.

Figure 9:
FIG. 9 illustrates an example of a framework that may be implemented on a variety of programmable devices, in accordance with an embodiment of the present invention.

It is understood that when referring to mobile devices or mobile platforms, various other types of programmable devices, platforms and application frameworks may be utilized by embodiments of the present invention, including mobile phones (including iPhone OS based devices, Android OS based devices, Windows mobile devices, Symbian OS and RIM OS, etc.), mobile consumer platforms (including iPod touch, Zune, PSP, Nintendo DS, etc.), tablet devices (including iPad, all Windows tablet edition devices, etc.), televisions (including Samsung SDK capable devices), "Smart Appliances" (including refrigerators, washing machines and any other appliances equipped with support for application development), automobiles and other vehicles equipped with support for application development, digital billboards and other advertisement based devices equipped with support for application development, and other programmable devices. FIG. 9 illustrates an example of a framework that may be implemented on a variety of programmable devices including mobile phones, tablet devices, consumer platforms, televisions, smart appliances, automobiles, and digital billboards.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

While this invention has been described and illustrated with reference to particular embodiments, it will be readily apparent to those skilled in the art that the scope of the invention is not limited to the disclosed embodiments but, on the contrary, is intended to cover numerous other modifications and equivalent arrangements which are included within the spirit and scope of the following claims.

Aspects of the systems and methods described herein may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the systems and methods include: microcontrollers with memory, embedded microprocessors, firmware, software, etc. Furthermore, aspects of the systems and methods may be embodied in microprocessors having software-based circuit emulation, discrete logic (sequential and combinatorial), custom devices, fuzzy (neural network) logic, quantum devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

It should be noted that the various functions or processes disclosed herein may be described as data and/or instructions embodied in various computer-readable media, in terms of their behavioral, register transfer, logic component, transistor, layout geometries, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, email, etc.) over the Internet and/or other computer networks via one or more data transfer protocols (e.g., TCP, UDP, HTTP, FTP, SMTP, etc.). When received within a computer system via one or more computer-readable media, such data and/or instruction-based expressions of components and/or processes under the systems and methods may be processed by a processing entity (e.g., one or more processors) within the computer system in conjunction with execution of one or more other computer programs.

Unless specifically stated otherwise, as apparent from the following discussions, it is appreciated that throughout the specification, discussions utilizing terms such as "processing," "computing," "calculating," "determining," or the like, may refer in whole or in part to the action and/or processes of a processor, computer or computing system, or similar electronic computing device, that manipulate and/or transform data represented as physical, such as electronic, quantities within the system's registers and/or memories into other data similarly represented as physical quantities within the system's memories, registers or other such information storage, transmission or display devices. It will also be appreciated by persons skilled in the art that the term "users" referred to herein can be individuals as well as corporations and other legal entities. Furthermore, the processes presented herein are not inherently related to any particular computer, processing device, article or other apparatus. An example of a structure for a variety of these systems will appear from the description below. In addition, embodiments of the invention are not described with reference to any particular processor, programming language, machine code, etc. It will be appreciated that a variety of programming languages, machine codes, etc. may be used to implement the teachings of the invention as described herein.

Unless the context clearly requires otherwise, throughout the description and the claims, the words 'comprise,' 'comprising,' and the like are to be construed in an inclusive sense as opposed to an exclusive or exhaustive sense; that is to say, in a sense of 'including, but not limited to.' Words using the singular or plural number also include the plural or singular number respectively. Additionally, the words 'herein,' 'hereunder,' 'above,' 'below,' and words of similar import refer to this application as a whole and not to any particular portions of this application. When the word 'or' is used in reference to a list of two or more items, that word covers all of the following interpretations of the word: any of the items in the list, all of the items in the list and any combination of the items in the list.

The above description of illustrated embodiments of the systems and methods is not intended to be exhaustive or to limit the systems and methods to the precise form disclosed.

While specific embodiments of, and examples for, the systems and methods are described herein for illustrative purposes, various equivalent modifications are possible within the scope of the systems and methods, as those skilled in the relevant art will recognize. The teachings of the systems and methods provided herein can be applied to other processing systems and methods, not only for the systems and methods described above.

The elements and acts of the various embodiments described above can be combined to provide further embodiments. These and other changes can be made to the systems and methods in light of the above detailed description.

In general, in the following claims, the terms used should not be construed to limit the systems and methods to the specific embodiments disclosed in the specification and the claims, but should be construed to include all processing systems that operate under the claims. Accordingly, the systems and methods are not limited by the disclosure, but instead the scope of the systems and methods is to be determined entirely by the claims.

While certain aspects of the systems and methods are presented below in certain claim forms, the inventor contemplates the various aspects of the systems and methods in any number of claim forms. Accordingly, the inventor reserves the right to add additional claims after filing the application to pursue such additional claim forms for other aspects of the systems and methods.

What is claimed is:

1. A system for creating a mobile application framework to extend or promote branding of a plurality of customers within a targeted industry segment, comprising:
   computer memory comprising a resource that, with the aid of a computer processor, (i) organizes a set of substantially identical branding features provided by a developer into a plurality of pre-defined branding categories, wherein the plurality of pre-defined branding categories are designed for the targeted industry segment to promote or extend the brand of each of the plurality of customers, and (ii) creates a plurality of mobile applications for the customers within the targeted industry segment, wherein each mobile application includes a common user interface with the set of substantially identical branding features and a set of unique customized branding features designed for each particular customer that is distinguishable from other customers within the targeted industry segment;
   wherein each of the mobile applications, when presented on a display of a mobile device, includes (i) a navigation menu for accessing the plurality of pre-defined branding categories, and (ii) submenus for providing access to specific functions within the pre-defined branding categories; and
   wherein the branding features and pre-defined branding categories are accessible in the mobile applications to extend or promote branding of the customers within the targeted industry segment.

2. The system of claim 1, wherein the branding features include featured products, tutorials, games, media, or online shopping.

3. The system of claim 1, wherein the targeted industry segment of the customer is education, retail, or television and entertainment.

4. The system of claim 1, further comprising another resource in the computer memory for analyzing usage data of a user's interaction with the mobile application framework.

5. The system of claim 4, wherein the usage data includes statistics based on a number of times that specific functions are accessed.

6. The system of claim 4, wherein the usage data includes statistics based on an amount of time spent in specific functions.

7. The system of claim 4, wherein the usage data includes statistics based on a user's navigation patterns.

8. The system of claim 4, wherein the usage data includes statistics based on a user's network usage.

9. The system of claim 4, wherein the usage data includes an aggregation of usage data.

10. The system of claim 1, wherein the navigation menu simultaneously displays all of the plurality of pre-defined branding categories.

11. The system of claim 10, wherein the navigation menu is for accessing the plurality of pre-defined branding categories within a viewing area adjacent to the navigation menu.

12. The system of claim 1, wherein said application separates and distinguishes brands within the targeted industry segment in a familiar way.

13. A method for creating a mobile application framework to extend or promote branding of a plurality of customers within a targeted industry segment, the method comprising:
   organizing, using a computer processor, a set of substantially identical branding features provided by a developer into a plurality of pre-defined branding categories, wherein the plurality of pre-defined branding categories are designed for the targeted industry segment to promote or extend the brand of each of the plurality of customers; and
   creating, in a computer memory and using a computer processor, a plurality of mobile applications for the customers within the targeted industry segment, wherein each mobile application includes a common user interface with the set of substantially identical branding features and a set of unique customized branding features designed for each particular customer that is distinguishable from other customers within the targeted industry segment,
   wherein each of the mobile applications, when presented on a display of a mobile device, includes (i) a navigation menu for accessing the plurality of pre-defined branding categories, and (ii) submenus for providing access to specific functions within the pre-defined branding categories,
   wherein the branding features and pre-defined branding categories are accessible in the mobile applications to extend or promote branding of the customers within the targeted industry segment.

14. The method of claim 13, wherein the pre-defined branding categories include featured content, community, play/engage content, media, and mobile commerce.

15. The method of claim 14, wherein the featured content category allows the customer to push content to at least one user based on a marketing initiative of the customer.

16. The method of claim 14, wherein the mobile application connects to a social network via an application programming interface, and wherein the community category provides at least one user with access to social network content relating to the brand of the customer.

17. The method of claim 16, wherein the at least one user can interact with the mobile application framework through an interface of the social network.

18. The method of claim 14, wherein the play/engage category provides at least one user an ability to interact and engage in activities relating to the brand.

19. The method of claim 14, wherein the media category provides at least one user an ability to view or download images, video, audio or other content relating to the brand.

20. The method of claim 14, wherein the mobile commerce category provides an online store where at least one user may purchase subscriptions, merchandise, or access to digital content relating to the brand.

21. The method of claim 13, wherein the brand is selected from the group consisting of: a sports brand, a university brand, a television show brand, and a celebrity brand.

22. A non-transitory computer-usable storage medium having computer readable instructions stored thereon for execution by a computer processor to perform a method for creating a mobile application framework to extend or promote branding of a plurality of customers within a targeted industry segment, the method comprising:

organizing a set of substantially identical branding features provided by a developer into a plurality of pre-defined branding categories, wherein the plurality of pre-defined branding categories are designed for the targeted industry segment to promote or extend the brand of each of the plurality of customers; and creating a plurality of mobile applications for the customers within the targeted industry segment, wherein each mobile application includes a common user interface with the set of substantially identical branding features and a set of unique customized branding features designed for each particular customer that is distinguishable from other customers within the targeted industry segment, wherein each of the mobile applications, when presented on a display of a mobile device, includes (i) a navigation menu for accessing the plurality of pre-defined branding categories, and (ii) submenus for providing access to specific functions within the pre-defined branding categories;

wherein the branding features and pre-defined branding categories are accessible in the mobile applications to extend or promote branding of the customers within the targeted industry segment.

* * * * *